United States Patent [19]

Pierce

[11] Patent Number: 5,546,590
[45] Date of Patent: Aug. 13, 1996

[54] POWER DOWN STATE MACHINE FOR PCMCIA PC CARD APPLICATIONS

[75] Inventor: Michael E. Pierce, Orangevale, Calif.

[73] Assignee: Intel Corporation, Santa Clara, Calif.

[21] Appl. No.: 308,835

[22] Filed: Sep. 19, 1994

[51] Int. Cl.$^6$ .................................................. G06F 1/32
[52] U.S. Cl. ...................... 395/750; 364/707; 364/273.1; 364/273.3; 364/273.5; 364/DIG. 1
[58] Field of Search ................................. 395/750, 401, 395/750; 364/707, 492; 365/227, 226

[56] References Cited

U.S. PATENT DOCUMENTS

| | | | |
|---|---|---|---|
| 4,075,691 | 2/1978 | Davis et al. | 395/884 |
| 4,809,163 | 2/1989 | Hirosawa et al. | 395/750 |
| 4,841,440 | 6/1989 | Yonezu et al. | 395/750 |
| 5,167,024 | 11/1992 | Smith et al. | 395/375 |
| 5,230,074 | 7/1993 | Canova, Jr. et al. | 395/750 |
| 5,390,350 | 2/1995 | Chung et al. | 395/750 |
| 5,450,551 | 9/1995 | Amini et al. | 365/299 |
| 5,451,933 | 9/1995 | Stricklin et al. | 340/825.06 |
| 5,455,572 | 10/1995 | Cannon et al. | 340/825.44 |

*Primary Examiner*—Gopal C. Ray
*Attorney, Agent, or Firm*—Blakely, Sokoloff, Taylor & Zafman

[57] ABSTRACT

An apparatus and method for removing and applying power to circuitry within a Personal Computer Memory Card International Association (PCMCIA) PC card so as to reduce power consumption and, thus, prolong battery life for a portable computer system or electronic device, hereinafter referred to as a host system, in which the PC card is plugged is described. The PC card employs logic controlled by the host system to properly sequence control lines to and removal of power from the PC card circuitry to be powered down so as to prevent the occurrence of a CMOS latchup condition, allow for data to be saved and later restored when the circuitry is powered up, and maximize reduction in power consumption by the host system.

6 Claims, 6 Drawing Sheets

POWER DOWN STATE MACHINE FOR PCMCIA PC CARD APPLICATIONS

BACKGROUND OF THE INVENTION

1. Field of the Invention

The present invention relates to the field of Personal Computer Memory Card International Association (PCMCIA) PC cards. Specifically, the present invention relates to an apparatus and method for sequencing control signals and removing and applying power to circuitry within a PC card so as to reduce power consumption and, thus, prolong battery life for a portable computer system or electronic device in to which the PC card is plugged.

2. Description of Related Art

The Personal Computer Memory Card International Association (PCMCIA) defines and promulgates standards for data storage and peripheral expansion (I/O) cards for computer systems and other electronic products. One such standard is referred to as the PC card standard and governs an I/O type card known as a PC card. The standard is based on an integrated circuit card having 68 pins which can be plugged into a socket, or slot of a computer system or other electronic device, hereinafter referred to as a host system, that adheres to the electrical, physical and software requirements set forth in the standard. Today, credit card-sized peripheral devices, such as fax modems and network adapters, adhering to the PC card standard, are commercially available.

Currently, the worldwide market for portable computer systems and electronic devices, such as, but not limited to, notebooks, subnotebooks, palmtop computer systems and personal digital assistants is, overall, growing rapidly. Concomitant with the market growth for such systems is the demand for supported peripheral devices. Given the physical dimensions of these portable electronic systems, the dimensions and weight of peripheral devices supported by such systems become a critically important factor. Thus, credit-card sized peripheral devices (54 mm×85.6 mm×3.3/5.0 mm) compliant with the PC card standard are commonly supported by these systems.

Another important factor in portable computer systems and electronic devices is battery life, that is, the number of hours such systems can operate under battery power before recharging or replacing batteries. For example, battery life for a personal computer (PC) notebook is currently on the order of four to five hours. A number of factors, such as the use of low voltage (e.g., 3.3 volts) circuitry and the improvement in battery technology have helped extend battery life. Another way to further prolong battery life is to allow portable computer systems to shut down, that is, remove power from, circuitry not in use, including a PC card plugged in to and drawing power from the portable computer system.

Presently, the only method of significantly reducing power consumption with respect to a PC card involves powering down the entire PC card. No attempt is made to save information, such as current configuration settings, stored within the PC card to nonvolatile storage residing within the host system or the PC card before the PC card is powered down. As a result, the PC card must be loaded with default settings upon later power up. Any current configuration settings or data present in the PC card at the time of power down is irretrievably lost.

Furthermore, upon power down of the PC card, no attempt is made to sequence control signals to or removal of power from devices or circuitry within the PC card to prevent a possible so-called CMOS latchup condition. A CMOS latchup condition can occur when voltage is allowed to repeatedly exceed a maximum withstandable level, permanently damaging CMOS circuitry present within the PC card.

Likewise, upon power up of the PC card, no attempt is made to properly sequence control signals or the application of power to devices or circuitry within the PC card to prevent CMOS latchup or stabilize any oscillators present within the PC card.

Thus, a better apparatus and method for powering down a PC card, one that sequences control signals and removal of power in a way that protects the circuitry located therein, and provides an option to save information contained therein, is needed.

SUMMARY AND OBJECTS OF THE INVENTION

The present invention is an apparatus and method for sequencing control signals and removing and applying power to circuitry within a PC card so as to reduce power consumption and, thus, prolong battery life for a portable computer system or electronic device, hereinafter referred to as a host system, in to which the PC card is plugged. The invention comprises logic within the PC card. The logic is controlled by a host system in to which the PC card is plugged for sequencing control signals, e.g., interrupt, clock, and reset signals, and application or removal of power to PC card circuitry when applying or removing power to all or part of the PC card.

In an embodiment of the present invention, the logic is a finite state machine implemented in hardware, either as a counter-decoder or bit-slice circuit. An alternative embodiment of the present invention may be implemented in firmware and executed by a programmable controller. The former embodiment provides simplicity of implementation, whereas the latter embodiment provides flexibility in terms of the ability to modify the power down and power up sequence controlled by the finite state machine.

One object of the present invention is to sequence control signals to and removal of power from circuitry within a PC card to prevent a possible CMOS latchup condition, in which voltage, if allowed to repeatedly exceed an acceptable maximum level, can permanently damage CMOS circuitry within the PC card.

Another object of the invention is to power down circuitry within a PC card in such a way as to allow a microcontroller located therein to save current information to nonvolatile storage located either on the PC card or a host system in to which the PC card is plugged. For example, in a case where the PC card functions as a modem, it may be advantageous to save the current modem profile (e.g., baud rate, data bits, parity, and stop bits) before removing power from the PC card circuitry so as to be able to later restore the current modem profile rather than the default profile upon power up of the circuitry.

A further object of the present invention is to maximize power savings by powering down any and all clocks, typically consisting of oscillators. A PC card employing CMOS circuitry consumes approximately 100 mA continuously while in operation. With oscillators powered down, the PC card consumes only approximately 700 uA continuously.

Yet another object of the present invention is to power up a PC card that was previously powered down in such a way so as to prevent the occurrence of CMOS latchup, allow for oscillator stabilization by waiting a necessary number of clock cycles for one or more oscillators to stabilize to the correct frequency, and hold reset to a microcontroller located within the PC card for a certain number of clock cycles, if present. State machine driven cards, for example, a sound card or local area network card, like microcontroller driven cards, can also be controlled in the same manner.

The final object of the present invention is to allow a PC card that was powered down to determine if it should retrieve saved information, if indeed, information was saved immediately prior to power down, or reboot with default configuration parameters, upon power up.

The aforementioned and further objects, features and advantages of the present invention will be apparent from the detailed description of the preferred embodiment and figures which follow below.

BRIEF DESCRIPTION OF THE DRAWINGS

The present invention is illustrated by way of example and not limitation in the following figures.

Figure 1:
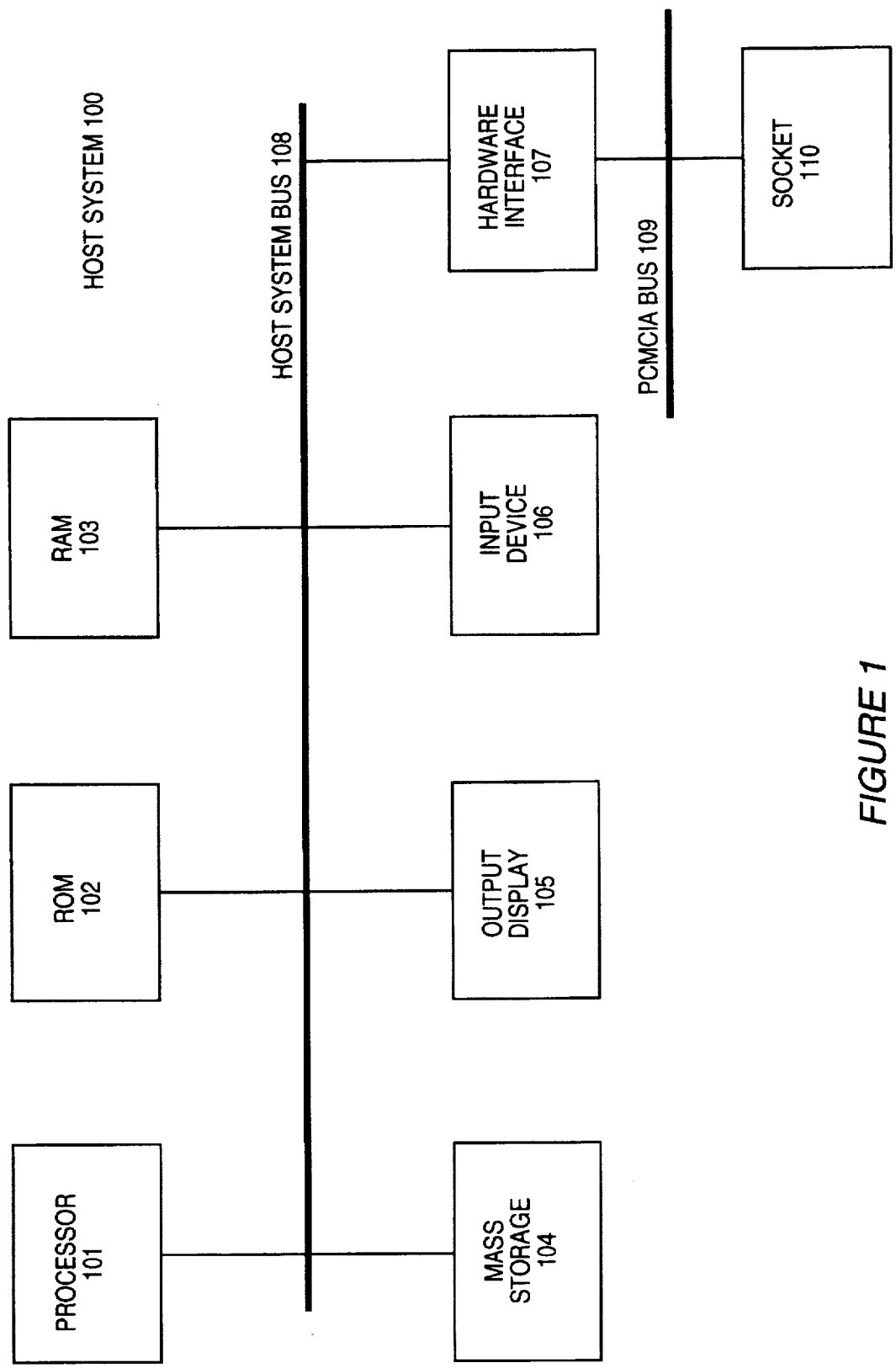
FIG. 1 is a block diagram of computer system hardware used in an embodiment of the present invention.

For ease of reference, it is noted that reference numerals in all of the accompanying drawings typically are in the form "drawing number" followed by two digits, nn. For example, reference numerals for FIG. 1 may be numbered 1 nn; on FIG. 2, 2nn, and so on. In certain cases, a reference numeral may be introduced in one drawing to refer to a particular item and the same reference number may be used on other drawings to refer to the same item.

DETAILED DESCRIPTION OF THE EMBODIMENTS OF THE INVENTION

The present invention describes an apparatus and method for removing and applying power to circuitry within a PC card so as to reduce power consumption and, thus, prolong battery life of an electronic device, for example, a portable computer system, in to which the PC card is plugged. In the following detailed description, for purposes of explanation, numerous specific details are set forth describing specific embodiments of the present invention, specific hardware platforms upon which certain components may be implemented, method steps, etc., in order to provide a thorough understanding of the present invention. However, it will be apparent to one of ordinary skill in the art that these specific details need not be used to practice the present invention. In other instances, well known devices, circuits, structures, interfaces, and processes have not been shown in detail in order not to unnecessarily obscure the present invention.

Referring to FIG. 1, a block diagram of the computer system hardware used in host system 100 of an embodiment of the present invention is illustrated. Host system 100 used in the embodiment comprises a host system bus 108 for communicating information between the components coupled thereto as shown in FIG. 1. In the embodiment, a central programmable processor 101 is an i486 or Pentium brand microprocessor manufactured by Intel Corporation, Santa Clara, Calif. Further shown in FIG. 1 are other computer system hardware components coupled to host system bus 108 including read only memory (ROM) 102, random access memory (RAM) 103, and mass storage device or disk drive 104. Further coupled to host system bus 108 is output display device 105, such as a cathode ray tube, liquid crystal display, or other suitable device for displaying output to an end user, and input device 106, such as a keyboard comprising a set of alphanumeric keys and, possibly, a mouse, track ball, scratch pad or other type of input device for controlling host system 100, including input to host system 100. Finally, host system 100 has coupled to host system bus 108 a hardware interface 107 comprising a PCMCIA adapter providing a host system bus 108 ( e.g., a PC Industry Standard Architecture (ISA) bus or Extended Industry Standard Architecture (EISA) bus) to PCMCIA bus 109 interface to which PCMCIA bus 109 is coupled. One or more PCMCIA PC cards can each be coupled to PCMCIA bus 109 by inserting the 68 pins of a PC card into a female receptacle or socket 110 in host system 100. In this way, processor 101 can communicate with a PC card through PCMCIA bus 109, according to well known standards defined and promulgated by the Personal Computer Memory Card International Association.

Apparatus Embodying The Power Down State Machine

Figure 2:
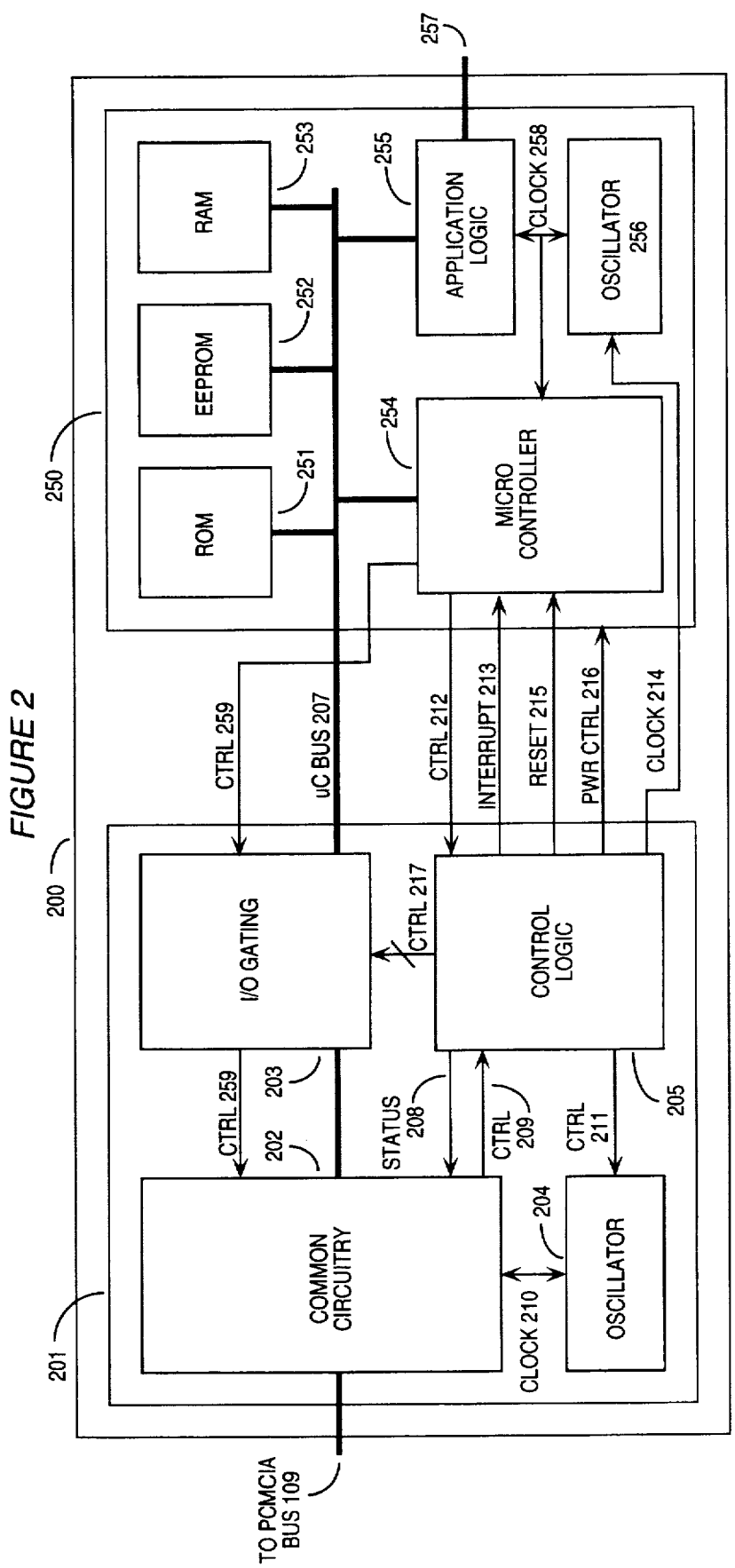
FIG. 2 illustrates a PCMCIA PC card in which an embodiment of the present invention may be implemented.

Referring now to FIG. 2, an embodiment of the present invention is illustrated. PC card 200 can be inserted into socket 110 of FIG. 1 so as to communicate with processor 101 of host system 100 via PCMCIA bus 109. PC card 200 is comprised of circuitry 250 to be powered down in the event PC card 200 is powered down to reduce power consumption. Within circuitry 250, PC card 200 has a logic device providing a specific function or application for the peripheral device such as a fax modem or network adapter, hereafter referred to as application logic device 255, or simply application logic 255. Communication over a communications line is conducted via line 257 coupled to application logic 255. Application logic 255 operates in its own clock domain at a frequency determined by oscillator 256. The clock signal provided by oscillator 256 is received by application logic 255 and microcontroller 254 by way of clock line 258. Application logic 255 shares a common internal data bus, microcontroller bus (uC bus) 207, with microcontroller 254, over which microcontroller 254 controls the operation of application logic 255. In addition, read only memory (ROM) device 251 and electrically erasable programmable read only memory (EEPROM) device 252 are coupled to uC bus 207 to provide nonvolatile memory storage on PC card 200. Further coupled to uC bus 207 is dynamic random access memory (RAM) device 253 or other volatile memory storage device to provide volatile memory storage on PC card 200.

PC card 200 is further comprised of circuitry 201 to remain powered up notwithstanding an event in which PC card 200 is powered down. Within circuitry 201 is common circuitry 202, comprising components such as address buffers, host system control signals, registers controlled by the host system, static random access memory (SRAM), a universal asynchronous receiver transmitter (UART) and other miscellaneous components providing various necessary functions for the operation of PC card 200. Common circuitry 202 operates in its own clock domain at a frequency determined by oscillator 204. The clock signal provided by oscillator 204 is received by common circuitry 202 by way of clock line 210. I/O gating 203 acts as a switch to buffer and enable/disable coupling between uC bus 207 and common circuitry 202. Circuitry 201 is further comprised of a finite state machine implemented in control logic 205. Control logic 205 is controlled via control line 209 by a host system 100 in to which the PC card is plugged. Control logic 205, in turn, controls I/O gating 203, components of common circuitry 202, such as registers, and all oscillators via control bus 217 and 211, respectively. Control logic 205 controls the components of circuitry 250 by way of the interrupt 213, clock 214, reset 215, and power control 216 control lines. Control line 212 provides feedback from microcontroller 254 to control logic 205, for example, to cause the state machine implemented therein to wait during a power down sequence. Status of control logic 205 can be viewed by host system 100 via status line 208.

Figure 3:
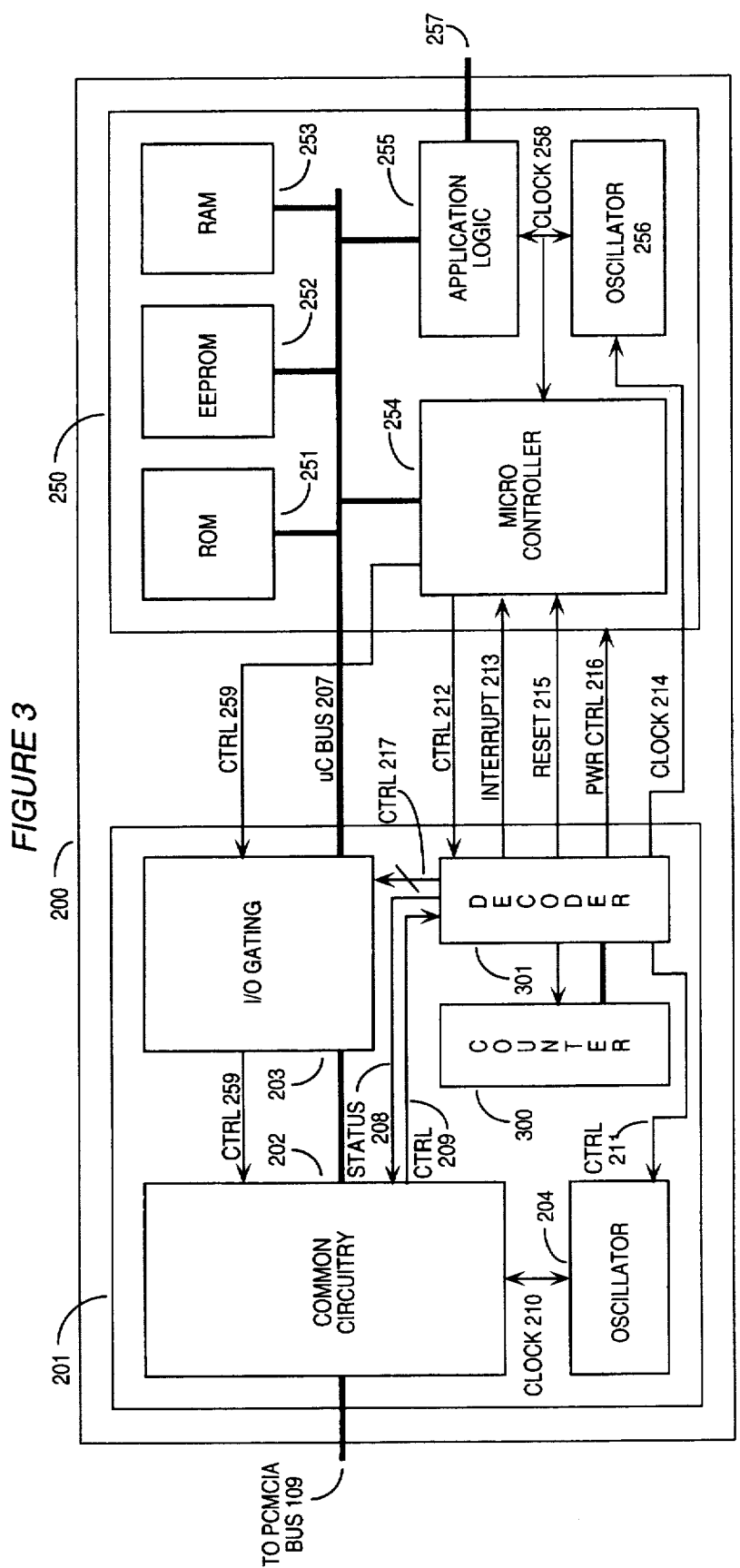
FIG. 3 illustrates a PCMCIA PC card in which a hardware embodiment of the present invention is implemented.

FIG. 3 illustrates a hardware embodiment of control logic 205 of the present invention. In the embodiment, control logic 205 is comprised of a counter-decoder circuit to manipulate sequencing of the signals that control the operation, power down, and power up of circuitry 250, such as the signals transmitted over the interrupt 213, clock 214, reset 215 and power control 216 control lines. In the embodiment, counter 300 may be comprised of sequential logic (e.g., flip-flops), and decoder 301 may be comprised of combinational logic (e.g., AND gates), the design and operation of which is well known to those of ordinary skill in the art of computer logic design. Therefore, further description is not felt to be necessary.

Figure 4:
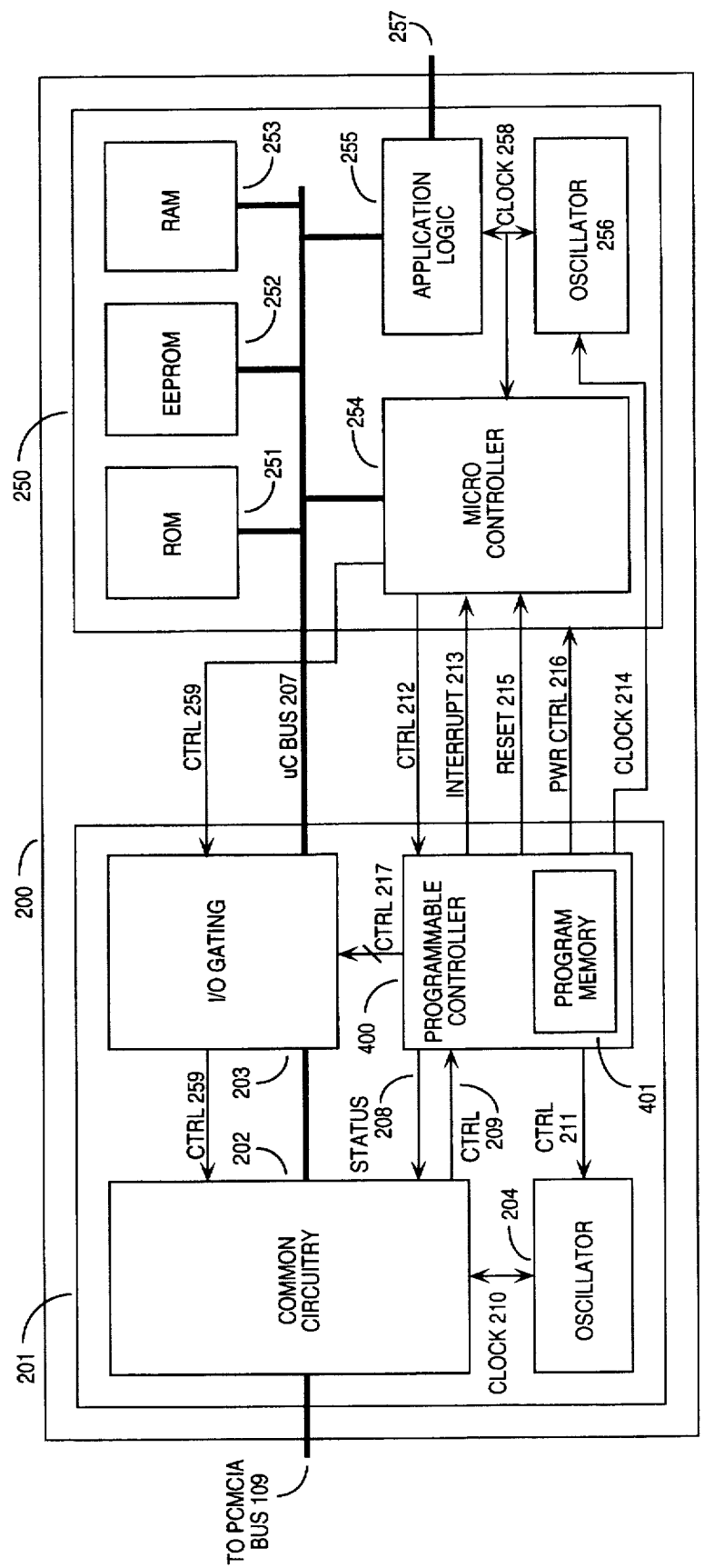
FIG. 4 illustrates a PCMCIA PC card in which a firmware embodiment of the present invention is implemented.

Alternatively, FIG. 4 illustrates a firmware embodiment of control logic 205 of the present invention. In the embodiment, control logic 205 is comprised of a programmable controller 400, having its own program memory 401, where each microinstruction stored therein represents a state of the finite state machine implemented in firmware. In the embodiment shown in FIG. 4, programmable microcontroller 400 is an 8051 microcontroller manufactured by Intel Corporation, Santa Clara, Calif.

If a determination is made by an end user, for example, by pressing a function key on a keyboard, or by the expiration of an application or operating system software inactivity timer, to power down PC card 200, or if PC card 200 determines on its own to power down so as to reduce power consumption and thereby prolong battery life, circuitry 250 therein is powered down, while circuitry 201 therein remains powered up. However, oscillator 204 may also be powered down for additional power savings.

Method Embodied For Powering Down The PC Card

Figure 5:
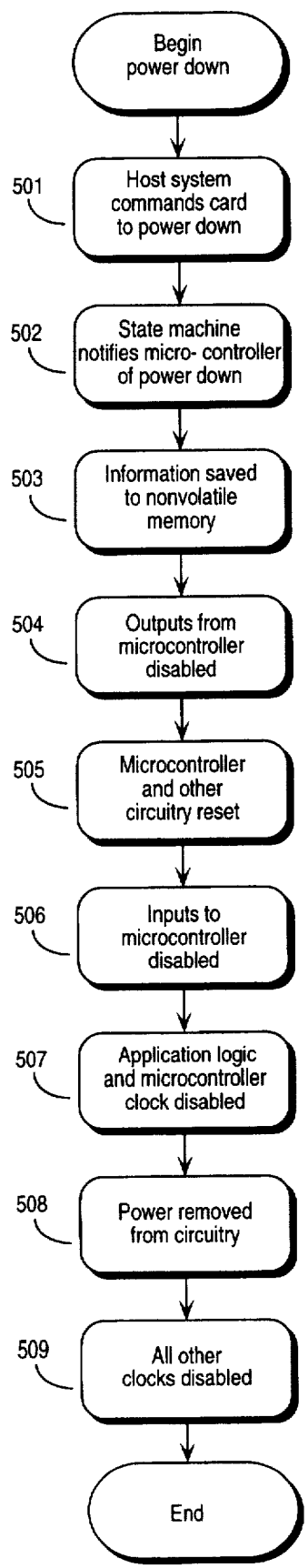
FIG. 5 is a flow chart of a method embodied by the present invention for powering down circuitry of a PC card.

Referring now to FIG. 5, a method embodied by the present invention for powering down circuitry of PC card 200 is as follows. It is understood that the method, if implemented in hardware as shown in FIG. 3, may not necessarily incorporate all steps in order to attain certain power saving goals.

First, at step 501, processor 101 of host system 100 commands PC card 200 to power down. This may be by way of the power down (PwrDwn) bit in the card configuration and status register of PC card 200, a register located in common circuitry 202 which contains information about the card's condition. Alternatively, host system 100 can request microcontroller 252 to initiate the power down sequence by means of a dedicated control signal transmitted over control line 259 as shown in FIG. 2. Microcontroller 254 passes the dedicated control signal to the card configuration and status register. Further information regarding the card configuration and status register can be found in PCMCIA PC Card Standard Specification, release 2.1, November, 1993.

At step 502, control logic 205 notifies microcontroller 254 located within PC card 200 of a pending power down event. Notification may be interrupt driven, or microcontroller 254 may periodically poll the power down bit in the card configuration and status register for the event. Polling is performed over uC bus 207 or a general purpose port of microcontroller 254 (not shown). Upon receiving notification of a pending power down event, microcontroller 254 will begin a transition to either a halt state, wherein microcontroller 254 stops executing instructions, or idle state, wherein microcontroller 254 continues executing instructions in a small program loop while waiting for an event, such as an interrupt, or continues polling the power down bit in the event host system 100 exits the power down routine.

If control logic 205 controls the power down sequencing, it will wait a predetermined length of time for microcontroller 254 to enter the halt or idle state before proceeding to the next step. However, if PC card 200 is powered down under the control of microcontroller 254, control logic 205 will wait for a signal via control line 212 indicating the beginning of a transition to power down from microcontroller 254. Control logic 205 will then further wait an additional predetermined length of time for microcontroller 254 to perform housekeeping and enter the halt or idle state before proceeding to the next step. Whether control logic 205 controls the power down sequencing depends on how the embodiment of the present invention is implemented. If the present invention is implemented in hardware as illustrated in FIG. 3, control logic 205 controls the power down sequencing. If the present invention is implemented in firmware as illustrated in FIG. 4, control logic 205 may either wait for a signal via control line 212 indicating the beginning of a transition to power down from microcontroller 254, or be preprogrammed with a fixed period of delay.

At step 503, control logic 205 waits the prescribed length of time, either fixed or programmable, while microcontroller 254 performs housekeeping, at which time microcontroller 254 aborts any tasks in progress and then saves information to nonvolatile memory devices such as EEPROM 252, or SRAM or registers located within common circuitry 202. When housekeeping is completed, microcontroller 254 can notify control logic 205 of its completion by way of control line 212. If a fixed delay for housekeeping is used, the notification step is, obviously, not necessary. PC card 200 should be designed so that at least some areas in nonvolatile memory storage (e.g., registers) located within common circuitry 202 can be reset by host system 100. In this way, a mechanism exists to distinguish the difference between a reboot versus a return from a power down state, that is, a power up. A host system 100 reset signal is available during reboot to initialize these registers to a default state. The state of each register can be altered when PC card 200 enters a power down state. Thus, when PC card 200 powers up, the registers will contain the altered state, indicating a return from a power down state rather than a reboot. Thus, when microcontroller 254 is powered up, these registers can be used to determine if a reboot using default configuration settings or a power up using settings previously saved during power down should be performed.

As stated earlier, microcontroller 254 may save information in register locations within common circuitry 202. If indeed, information is saved, microcontroller 254 further sets a flag maintained at a particular bit location within one of the aforesaid registers located in common circuitry 202 to indicate information is, in fact, saved. Thereafter, upon power up of circuitry 250, if the flag indicating information has been saved is set, PC card 200 will retrieve the information thus saved. If, however, the flag is not set, PC card 200 will reboot with default settings.

Next, at step 504, disable outputs from microcontroller 254 by shutting off any corresponding inputs to circuitry that is going to remain powered up, such as that illustrated in circuitry 201 of FIG. 2. This is accomplished by logic control 205 manipulating inputs to and outputs from I/O gating 203 via control bus 217. This prevents inadvertent operation of the circuitry while power is removed from microcontroller 254. Wait a predetermined length of time.

At step 505, an embodiment of the present invention may optionally assert and continue holding for a predetermined length of time a reset to microcontroller 254 and any other circuitry that will be powered down, such as circuitry 250, in the event information needs to be saved.

Thereafter, at step 506, shut off any outputs from circuitry 201 to circuitry 250, the latter of which is to be powered down. Internal signals within circuitry 201 that help keep circuitry 201 remaining powered up in stable condition are not shut off, for example status line 208, control lines 209, 211, and 217, etc. At step 507, disable oscillator 256 via clock line 214, which shuts off all clocks in circuitry 250, and at step 508, power down circuitry 250 via power control line 216, including removal of power to microcontroller 254.

Step 508 can be completed, for example, using a FET switch to disconnect $V_{cc}$ or ground from the devices. As this use of an FET switch is well known to those of ordinary skill in the art, further description is not considered necessary. In general, critical control signals, such as reset 215, can either be set to high impedance or driven to ground if $V_{cc}$ was disconnected, or to $V_{cc}$ if ground was disconnected. Care must be exercised so that all inputs to circuitry 250, which is now powered down, are not being driven by any voltages, so as to prevent a CMOS latchup condition when power is restored. Note that at this time, oscillator 204 is still functioning and, thus, consuming power.

Finally, at step 509, shut off oscillator 204 via control line 211. This completes the power down sequence, stopping all clocks, thereby reducing power consumption to a minimum.

Method Embodied For Powering Up The PC Card

Figure 6:
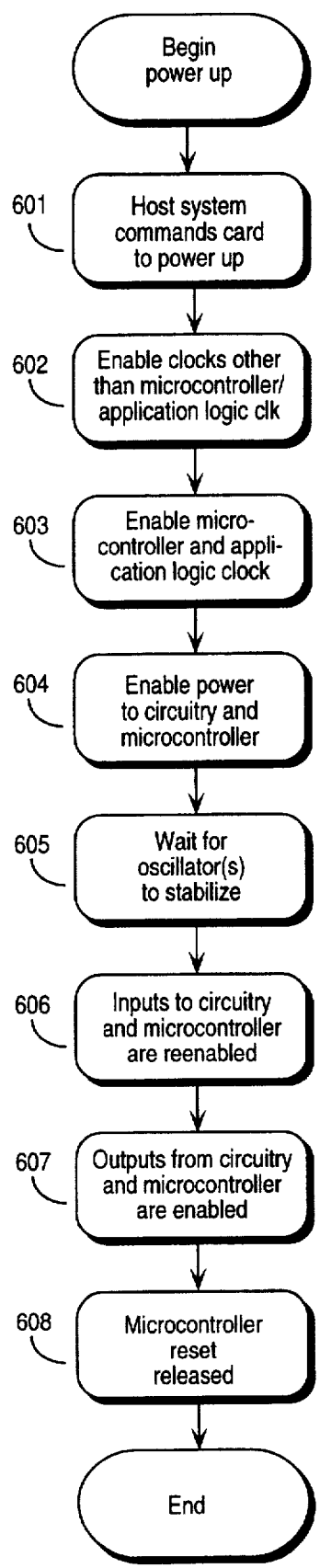
FIG. 6 is a flow chart of a method embodied by the present invention for powering up circuitry of a PC card.

A PC card, such as PC card 200 in an embodiment of the present invention, that is in the powered down state can be powered up when needed. For example, if the application supported by application logic 255 of PC card 200 is that of a modem, and ring indication is asserted, as when communication with host system 100 is initiated, PC card 200 informs host system 100 via the power down bit in the card configuration and status register. Host system 100 powers up PC card 200 so the modem can answer the call. Referring now to FIG. 6, a method for applying or restoring power to PC card 200 is as follows. It generally follows the reverse series of steps as described above for the method embodied for powering down of PC card 200.

At step 601, host system 100 commands PC card 200 to power up. Control logic 205, at step 602, enables one or more oscillators that were powered down, specifically oscillator 204, in the event it was shut off, via control line 211, and other oscillators by their respective control signals. The reset signal transmitted over reset line 215 at step 505 continues to remain asserted via reset line 215 during this time. Control logic 205 waits a predetermined amount of time before proceeding to step 603.

Thereafter, at step 603, control logic 205 enables the clock (oscillator 256) for application logic 255 and microcontroller 254 via clock line 214, and at step 604, enables power to circuitry 250, including microcontroller 254, via power control line 216. After waiting a period of time for oscillators to stabilize at step 605 (e.g., typically a few hundred to a few thousand clock cycles), outputs that drive any input of any device, including microcontroller 254, in circuitry 250 that were disabled are reenabled at step 606. The reset signal continues to be asserted by control logic 205 via reset line 215 during this time. Control logic 205 again waits a predetermined amount of time before proceeding to the next step.

At step 607, control logic 205 effectively enables inputs to circuitry 201 that did not get disabled by enabling outputs from circuitry 250, including microcontroller 254, that did get disabled when circuitry 250 was previously powered down.

Control logic 205 finally deasserts, at step 608, the reset signal transmitted over reset line 215 and allows microcontroller 254 to begin execution. Microcontroller 254 examines the registers located within common circuitry 202 to determine if a power down operation was performed. FF the registers contains default values to which PC card 200 is initialized when reset or rebooted, then microcontroller 254 should simply reboot and load default settings. On the other hand, if the values are something that microcontroller 254 wrote to memory prior to power down, power down recovery routines are executed by microcontroller 254, including restoring information, for example, configuration settings, saved on power down.

Thus, an apparatus and method for sequencing control signals and removing and applying power to circuitry within a PC card so as to reduce power consumption and, thus, prolong battery life for a portable computer system or electronic device in to which the PC card is plugged is disclosed. The specific apparatus and details set forth herein are illustrative of, but not limited to, an embodiment in which the present invention can be employed.

I claim:

1. A method for removing power to certain circuitry of a peripheral device, said certain circuitry comprising a microcontroller volatile and nonvolatile memory, application logic, and a microcontroller and application logic clock, said method for removing power to certain circuitry controlled by control logic of said peripheral device, said peripheral device coupled in communication with a computer system, comprising the steps of:

a) notifying said peripheral device to power down;

b) notifying said microcontroller of a pending power down event;

c) saving information in said volatile memory to said nonvolatile memory;

d) setting a flag in said nonvolatile memory indicating said information has been saved;

e) transferring said microcontroller to a halt state;

f) shutting off inputs driven by said microcontroller to circuitry including said control logic of said peripheral device other than said certain circuitry to which power is to be removed;

g) asserting and holding a reset signal to said microcontroller and said certain circuitry to which power is to be removed;

h) disabling inputs to said certain circuitry to which power is to be removed;

i) disabling and removing power from said microcontroller and application logic clock;

j) removing power from said certain circuitry excluding said microcontroller; and k) removing power from said microcontroller.

2. A method for applying power to certain circuitry of a peripheral device, said certain circuitry comprising a microcontroller, volatile and nonvolatile memory, application logic, and a microcontroller and application logic clock, said method for applying power to certain circuitry controlled by control logic of said peripheral device, said peripheral device coupled in communication with a computer system, comprising the steps of:

a) notifying said peripheral device to power up;

b) applying power to and enabling said microcontroller and application logic clock;

c) applying power to said certain circuitry including said microcontroller;

d) waiting a length of time for said microcontroller and application logic clock to stabilize;

e) enabling inputs to said certain circuitry to which power has been applied, including inputs to said microcontroller;

f) asserting a reset signal to said microcontroller and said certain circuitry to which power has been applied;

g) enabling inputs driven by said microcontroller to circuitry including said control logic of said peripheral device other than said certain circuitry;

h) deasserting said reset signal to said microcontroller and said certain circuitry to which power has been applied, allowing said microcontroller to begin operating; and i) checking a flag in said nonvolatile memory to determine whether information has been saved on a previous power down, and, if information has been saved, retrieving said information from said nonvolatile memory.

3. A method for removing power to certain circuitry of a peripheral device coupled in communication with a computer system, said certain circuitry comprising a microcontroller, a memory, and a clock, said method controlled by a control logic circuit in said peripheral device, comprising the steps of:

a) notifying said peripheral device to power down;

b) notifying said microcontroller of a pending power down event;

c) transferring said microcontroller to a halt state;

d) shutting off inputs driven by said microcontroller to circuitry other than said certain circuitry;

e) disabling inputs to said certain circuitry;

f) removing power from said clock; and g) removing power from said certain circuitry.

4. A method for applying power to certain circuitry of a peripheral device coupled in communication with a computer system, said certain circuitry comprising a microcontroller, a memory, and a clock, said method controlled by a control logic circuit in said peripheral device, comprising the steps of:

a) notifying said peripheral device to power up;

b) applying power to said clock;

c) applying power to said certain circuitry;

d) waiting a length of time for said clock to stabilize;

e) enabling inputs to said certain circuitry;

f) deasserting said reset signal to said certain circuitry;

g) enabling inputs driven by said microcontroller to circuitry other than said certain circuitry; and h) deasserting said reset signal to said certain circuitry.

5. A method for removing power to certain circuitry of a peripheral device coupled in communication with a computer system, said certain circuitry comprising a microcontroller, a volatile and nonvolatile memory, and a clock, said method controlled by a control logic circuit in said peripheral device, comprising the steps of:

a) notifying said peripheral device to power down;

b) notifying said microcontroller of a pending power down event;

c) said microcontroller saving information in said volatile memory to said nonvolatile memory;

d) said microcontroller setting a flag in said nonvolatile memory indicating said information has been saved;

e) transferring said microcontroller to a halt state;

f) shutting off inputs driven by said microcontroller to circuitry other than said certain circuitry, including said control logic circuit;

g) asserting and holding a reset signal to said certain circuitry;

h) disabling inputs to said certain circuitry;

i) removing power from said clock;

j) removing power from said certain circuitry excluding said microcontroller; and k) removing power from said microcontroller.

6. A method for applying power to certain circuitry of a peripheral device coupled in communication with a computer system, said certain circuitry comprising a microcontroller, a volatile and nonvolatile memory, and a clock, said method controlled by a control logic circuit in said peripheral device, comprising the steps of:

a) notifying said peripheral device to power up;

b) applying power to said clock;

c) applying power to said certain circuitry;

d) waiting for said clock to stabilize;

e) enabling inputs to said certain circuitry;

f) asserting a reset signal to said certain circuitry;

g) enabling inputs driven by said microcontroller to circuitry other than said certain circuitry, including said control logic circuit;

h) deasserting said reset signal to said certain circuitry, allowing said microcontroller to begin operating; and i) checking a flag in said nonvolatile memory to determine whether information has been saved on a previous power down, and, if information has been saved, retrieving said information from said nonvolatile memory.

* * * * *

UNITED STATES PATENT AND TRADEMARK OFFICE
CERTIFICATE OF CORRECTION

PATENT NO.   : 5,546,590
DATED        : August 13, 1996
INVENTOR(S)  : Michael E. Pierce It is certified that error appears in the above-identified patent and that said Letters Patent is hereby corrected as shown below:

In the Abstract at [57] at line 6 insert --to-- following "in" and prior to "which"

In column 3 at line 59 delete "an" and insert --art--

In column 10 at line 9 delete "deasserting said" and insert --asserting a--

Signed and Sealed this

Twelfth Day of November, 1996

Attest:

BRUCE LEHMAN

Attesting Officer    Commissioner of Patents and Trademarks